Oct. 20, 1970  I. D. PRESS  3,534,436
APPARATUS FOR TREATING EXTRUDED P.T.F.E. TUBING
Original Filed Oct. 7, 1965  2 Sheets-Sheet 1

INVENTOR
IRVING D. PRESS

ATTORNEYS.

Oct. 20, 1970   I. D. PRESS   3,534,436
APPARATUS FOR TREATING EXTRUDED P.T.F.E. TUBING
Original Filed Oct. 7, 1965                           2 Sheets-Sheet 2

INVENTOR
IRVING D. PRESS

ATTORNEYS.

United States Patent Office 3,534,436
Patented Oct. 20, 1970

3,534,436
APPARATUS FOR TREATING EXTRUDED
PTFE TUBING
Irving D. Press, West Orange, N.J., assignor to Resistoflex Corporation, Roseland, N.J., a corporation of New York
Original application Oct. 7, 1965, Ser. No. 493,698, now Patent No. 3,480,707, dated Nov. 25, 1969. Divided and this application Feb. 24, 1969, Ser. No. 813,371
Int. Cl. B29f 5/02
U.S. Cl. 18—6                                    7 Claims

ABSTRACT OF THE DISCLOSURE

Unsintered PTFE resin in paste form is extruded directly upon the periphery of a spiral ramp which is rotated in front of the mouth of the extruder and translated axially relative thereto. While so supported, the unsintered tubing on the rack is placed within an oven and sintered. The tubing is then withdrawn from the rack as the rack is positively driven in step with the rate of withdrawal, the tubing being withdrawn through the wall of the oven directly into a quenching trough and onto a take-up drum or reel.

---

This application is a division of copending application Ser. No. 493,698, filed Oct. 7, 1965, now Pat. No. 3,480,707.

The present invention relates to a process for producing extruded articles, and particularly but not necessarily tubing from polytetrafluoroethylene (hereinafter abbreviated PTFE) resin and to apparatus for use in connection therewith.

A major use for PTFE resin is in the fabrication of tubing for flexible hose lines. Commercial production presently utilizes a paste mixture of PTFE resin and a volatilizable liquid extrusion aid, the mixture being extruded in tubular form, then heated to drive off the extrusion aid and sinter the resin, and, finally quenched. Prior to the present invention no practical procedure was known for carrying out the foregoing steps with long lengths of tubing. For example, in one process lengths up to about 25 ft. are extruded, placed in pipes, and supported thereby in elongated hot air ovens for heating and sintering. Quenching is accomplished by transferring the pipe along with the sintered tubing from the oven into a quenching tank. Practical limitations on the lengths of the oven and the pipes determine the maximum length of tubing that can be produced.

In the actual manufacture of hose from PTFE tubing the quality and performance of the finished product is dependent upon numerous factors. Two such factors are the dimensional control maintained on the tubing as well as its crystallinity. The best tolerance control maintainable on the outer diameter of tubing produced by the known process described above is from .010 to .015 inch. The outer diameter of the tubing is significant when braiding or spiral wrapping an external reinforcing layer.

In spiral wrapping, the tubing normally is placed upon a mandrel from which it must be withdrawn after the spiral wrap is applied. Generally, due to the inherent nature of the process, the wall thickness of the tube will remain essentially constant. Hence, if the outer diameter is permitted to vary, the inner diameter will vary accordingly. It will thus be appreciated that adherence to close tolerances is required in order that the tubing will make a snug but not too tight fit on the mandrel when a spiral wrap is applied.

In connection with braiding an external reinforcing layer, it will be appreciated that the angle of the braid will vary with change in the diameter of the tubing. The strength of the braid is a function of the braid angle. Hence, more uniform and stable strength characteristics can be obtained with more uniform and constant tubing dimensions.

An object of the present invention, therefore, is to produce more uniform tubing. It has been found that the process to be described enables tubing to be produced with a tolerance on the outer diameter of from .003 to .005 inch.

Another object of the present invention is to produce continuous long lengths of tubing or other articles limited essentially only by the capacity of the extruding equipment.

A still further object of the invention is to provide a process whereby the minimum crystallinity is obtainable in the production of PTFE tubing or other articles.

The new process according to the present invention includes the steps of coiling lengths of unsintered extruded PTFE resin into an open spiral and sintering said lenths of resin while so coiled. It also includes the steps of heating coiled lengths of resin to sintering temperature and quenching the resin while uncoiling it. In the carrying out of the process special apparatus is required giving rise to additional aspects of the present invention.

The invention will be better understood after reading the following detailed description thereof with reference to the appended drawings wherein.

For convenience, the following description will be restricted to the manufacture of tubing, but it will be understood that the process and apparatus can be applied to the manufacture of long lengths of extruded rods and shapes other than tubing.

Figure 1:
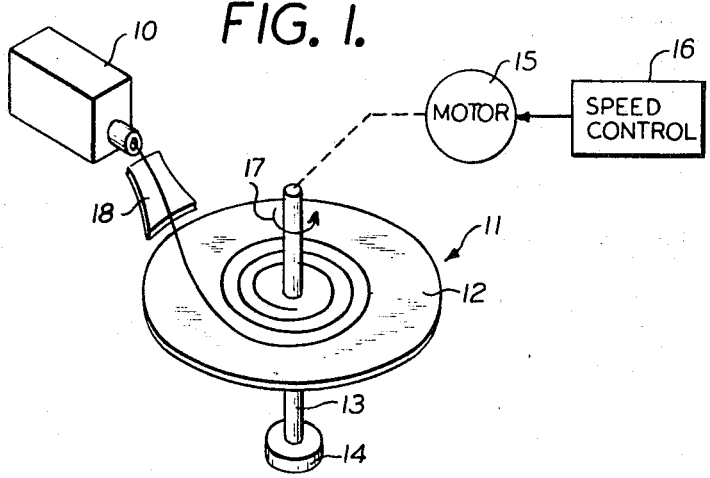
FIG. 1 is a diagrammatic illustration of one form of apparatus for use in the extrusion phase of the present invention.

Referring to FIG. 1, there is shown, generally at 10, a conventional extruder for use in the extrusion of PTFE paste. A special rack 11 is mounted adjacent to the mouth of the extruder, as shown. The rack 11 consists essentially of a flat circular plate 12 mounted on a vertical shaft 13 which is journaled in bearings, such as the one shown at 14. An electric motor 15 having a speed control 16 is coupled mechanically to the shaft 13 for rotating the rack 11 in the direction shown by the arrow 17. A supporting bridge 18 is placed between the rack 11 and the extruder 10.

When it is desired to extrude a length of tubing the operator will first start the extruder causing the leading end of the extrudate to pass along the bridge 18 and onto the plate 12 until it approaches its center. At this time he will start the motor 15 causing rotation of the rack 11 and controlling its speed so that the extrudate is coiled upon the rack in a loose spiral as it leaves the extruder. The spacing between turns of the coil will depend upon the size of the tubing being extruded and by factors which will be mentioned below in discussing the sintering steps.

Figure 2:
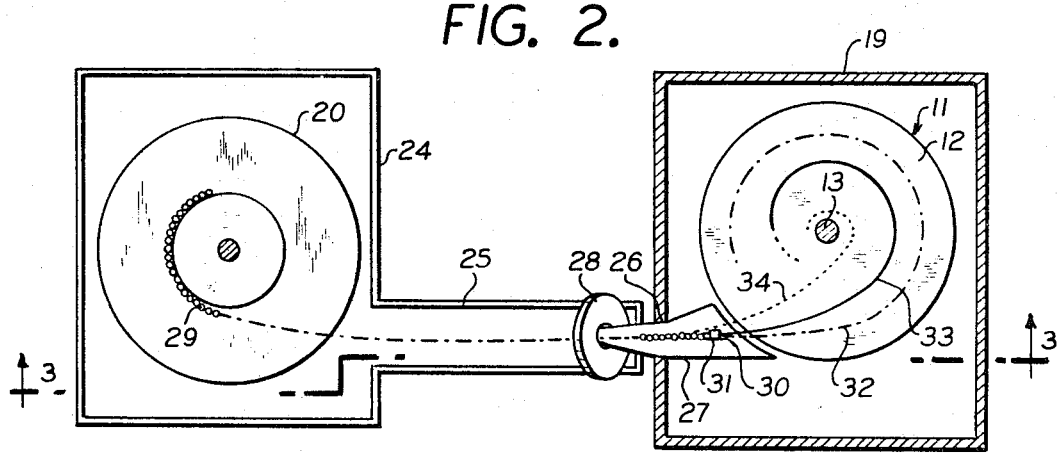
FIG. 2 is a diagrammatic plan view of equipment for sintering and quenching the tubing extruded with the apparatus of FIG. 1.
Figure 3:
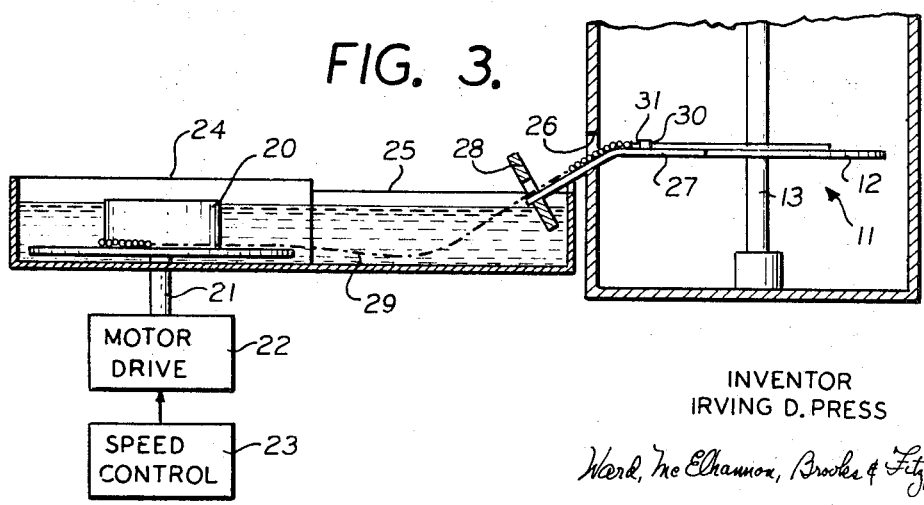
FIG. 3 is a cross-section, also diagrammatic, taken along line 3—3 in FIG. 2.

After the rack 11 is fully loaded it can be transported with the extruded tubing thereon into an oven 19 as seen in FIGS. 2 and 3. While not shown, an appropriate speed controlled motor drive for rotating the rack 11 is provided in association with the oven.

Located externally of the oven is a take-up reel 20 mounted for driven rotation about a vertical axis 21 by a motor 22 under control of a speed control 23. The reel 20 is mounted in a tank 24 provided with a trough 25 extending laterally therefrom. The depth of the tank 24 and trough 25 should be sufficient to completely submerge the reel 20 in the quenching medium, e.g., water, as best seen in FIG. 3.

The oven 19 is provided with an aperture 26 in the wall thereof adjacent the end of the trough 25. A support or bridge 27 is mounted in aperture 26 with one end adjacent the periphery of the rack plate 12. The other end of the support 27 should extend into the trough 25 a short distance below the water level. A water-spray ring 28 is shown adjacent the external end of the support 27. The angle or slope of the support 27 as it passes through the ring 28 and into the water in the trough 25 is, preferably, as slight as possible. This angle has been exaggerated in the drawing for convenience in illustration.

When the rack 11 with the extruded tubing thereon is installed in the oven 19 a flexible leader 29 is connected from the reel 20 to the free end of the extruded tubing which is brought out onto the support 27 to the point 30. A swivel connection 31 should be used in joining the tubing to the leader. The leader 29 may take the form of a beaded chain or the like.

With the extruded tubing so installed the oven can be turned on so as to proceed through the normal sintering cycle. At the start of the heating phase, the outermost turn of the tubing may occupy the position shown by the dot dash line 32. However, as extruded PTFE tubing is heated to drive off the volatilizable extrusion aid and to sinter the resin the tubing will shrink longitudinally. It will be found that this will result in the tubing "tightening" its coils on the rack 11. When the sintering phase is complete it will be found that the outermost turn of the tubing occupies a new position such as, for example, that shown by the reference numeral 33. In the process of drawing radially inward the tubing tends to roll. Hence, the desirability of having a swivel, such as 31, connecting the tube end to the leader. This will avoid any possibility of introducing stress to the tubing.

When sintering is complete, but while the oven is still at sintering temperature, the motor drives for both the reel 20 and the rack 11 may be started simultaneously. The speed of one or both may be controlled in order to maintain uniform tension on the tubing. If the rack 11 is rotating too fast, it will cause the tubing to buckle and ride off the support 27. If the reel 20 is too fast it will cause the tubing on the rack to tend to pull in and tighten its coils. Both of these effects are objectionable.

As the tubing leaves the oven still above its gel point it passes immediately through the water jet provided by the water-spray ring 28 and into the quench water in the trough 25. It should be readily apparent that by means of the apparatus shown in FIGS. 2 and 3, it is possible to maintain an extremely uniform and rapid quenching rate upon the tubing.

It has been found advisable to arrange the path of travel of the tubing through the spray ring 28 as near normal to the plane of the spray provided thereby as possible. In addition, the length of trough 25 should be selected preferably so that the tubing approaches room temperature before reaching the take-up reel 20.

As the tubing uncoils from the rack 11, the point at which it leaves the plate 12 will gradually move along its periphery towards the dashed line 34. In order to accommodate this movement the support 27 should be provided with a broad end, as shown.

Figure 4:
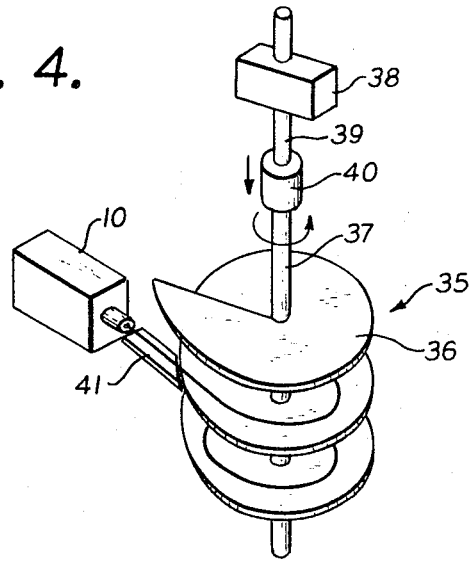
FIG. 4 is a diagrammatic illustration of another form of apparatus for practicing the extrusion phase of the present invention.
Figure 5:
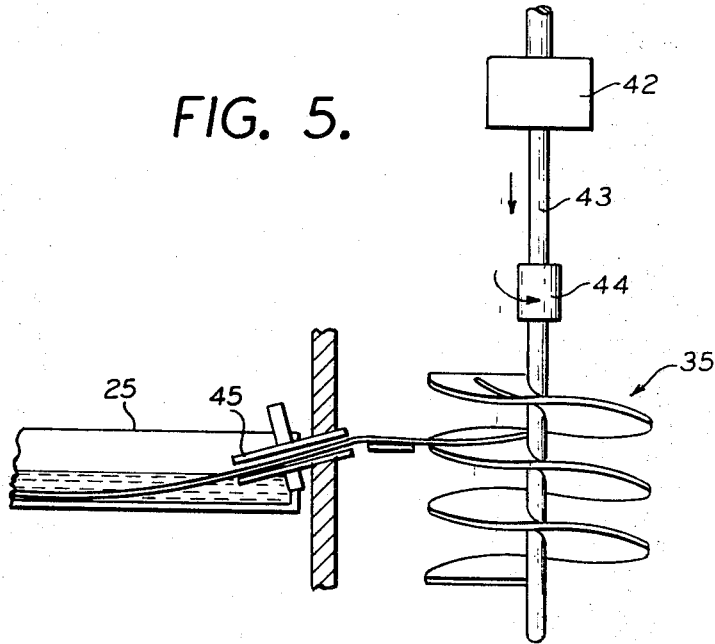
FIG. 5 illustrates diagrammatically the equipment for sintering and quenching tube extruded with the aid of the equipment shown in FIG. 4.

While a rack such as 11 having a single horizontal plane supporting surface is useful under certain circumstances, it will be found more advantageous to employ a helical rack such as that shown generally at 35 in FIGS. 4 and 5. The helical rack 35 is provided with a spiral ramp 36 supported by a vertical shaft 37. Referring to FIG. 4, any known mechanism 38 capable of simultaneously rotating and translating a shaft or tubular member 39 may be mounted above a point in front of the extruder 10. For example, the shaft 39 may be threaded internally and ride on an externally threaded core rod, and means may be provided for rotating the shaft 39 while the core rod is kept stationary. The lead of the threads on the core rod and shaft 39 should match that of the ramp.

For convenience, the end of the shaft 39 may be provided with a chuck or adjustable jaw device 40 for releasably engaging the upper end of the shaft 37. The longitudinal feed of the mechanism 38 and 39 should be directly related to the lead of the spiral ramp 36 so that its periphery traverses a point adjacent the mouth of the extruder 10. A suitable bridge support 41 may be disposed between the mouth of the extruder and the edge of the ramp 36.

Prior to commencement of extrusion, the rack 35 may be located at its highest point. As previously described, the extruder 10 is first started until the extrudate reaches a suitable point on the lowermost flight of the ramp 36. The rack 35 is then placed in operation with its speed controlled by means not shown in order to deposit the tubing near the radially outer periphery of the rack. The width of the ramp must be chosen to allow for the tightening of the tubing helix as the extrusion aid evaporates and the tubing is sintered.

After the rack is loaded it can be placed in an oven arranged as shown in FIG. 5. Drive mechanism 42, shaft 43, and chuck 44 are provided in association with the oven and are similar to the components 38, 39 and 40, respectively. The oven and quenching trough may be similar to that described above in connection with FIGS. 2 and 3. One modification shown in FIG. 5 is the provision of a spray tube 45 rather than the short spray ring 28. The tube 45 should be angled into the trough 25 so as to prevent quenching fluid from entering the oven. Again, however, this angle is preferably as slight as possible. The general procedure for sintering the tubing and removing it from the oven will be substantially the same as that described with reference to FIGS. 2 and 3. The relative speed of rotation of the rack 35 during uncoiling of the helix should be matched to the speed of the take-up reel, not shown, so as to avoid buckling or stretching of the tubing.

While a horizontal take-up reel has been illustrated in FIGS. 2 and 3, it is also possible to utilize a vertical reel or drum.

As shown in FIGS. 4 and 5, that end of the tubing which is first extruded is the end which is first removed from the oven. However, this relation is not essential.

While the helical rack is shown in FIGS. 4 and 5 as consisting of a ramp supported by a central shaft, it will be obvious that the shaft may be replaced by any convenient structure for mounting the ramp for rotation.

The invention has been described with reference to certain presently preferred embodiments thereof. It will be understood by those skilled in the art that changes may be made therein without departing from its true spirit as defined in the appended claims.

What is claimed is:

1. Apparatus for use in the fabrication of extruded PTFE resin articles which comprises an oven, an aperture in a side wall of said oven, means for supporting a spiral ramp within the oven with its periphery opposite said aperture, said last mentioned means being constructed for simultaneously rotating and longitudinally advancing said spiral ramp so as to pass the edges of said ramp past said aperture, means located outside of said oven for withdrawing said resin articles from said oven through said aperture at a speed correlated with the speed of rotation of said ramp, and means located adjacent said oven between the wall with said aperture and said means for withdrawing said article for rapidly cooling said article as it leaves the oven.

2. Apparatus according to claim 1, wherein said means for rapidly cooling said article comprises a trough supported adjacent said oven with a conduit communicating between one end thereof and said oven aperture, said trough being constructed to hold a quantity of a quenching fluid through which the article is drawn in passing from said aperture to said withdrawing means.

3. Apparatus according to claim 2, wherein said conduit comprises a spray tube for bathing said article in a cold fluid bath.

4. Apparatus according to claim 2, wherein said withdrawing means comprises a take-up reel mounted in a tank, and the end of said trough opposite said one end is in communication with said tank.

5. Apparatus according to claim 1, wherein a flexible leader is provided having one end for connection to said withdrawing means and an opposite end furnished with a swivel member for connection to an end of said article, said leader having sufficient length to extend from said withdrawing means through said aperture into said oven.

6. Apparatus according to claim 1, wherein a swivel action connecting member is provided for interconnecting an end of said article in said oven with said withdrawing means.

7. Apparatus according to claim 1, wherein said means for supporting the ramp in said oven comprises a chuck for engaging a hub on said ramp, a shaft supporting said chuck at one end, and means for both rotating and longitudinally translating said shaft.

References Cited

UNITED STATES PATENTS

| | | | |
|---|---|---|---|
| 1,536,087 | 5/1925 | Dykes | 18—6 XR |
| 1,633,591 | 6/1927 | Lampbough | 18—6 |
| 1,674,574 | 6/1928 | Semple. | |
| 2,627,083 | 2/1953 | Witthoft | 18—12 XR |
| 2,571,715 | 10/1961 | Henning | 18—12 XR |

J. SPENCER OVERHOLSER, Primary Examiner

R. S. ANNEAR, Assistant Examiner

U.S. Cl. X.R.

18—12